United States Patent
Holland et al.

(10) Patent No.: US 6,864,344 B1
(45) Date of Patent: Mar. 8, 2005

(54) SULFONATED CONDENSATION PRODUCTS WHICH ARE STABILE IN STORAGE, METHOD FOR THE PRODUCTION THEREOF, AND THEIR USE

(75) Inventors: Uwe Holland, Wehringen (DE); Martin Matzinger, Trostberg (DE); Johann Plank, Trostberg (DE)

(73) Assignee: SKW Polymers GmbH, Trostberg (DE)

( * ) Notice: Subject to any disclaimer, the term of this patent is extended or adjusted under 35 U.S.C. 154(b) by 250 days.

(21) Appl. No.: 10/088,712
(22) PCT Filed: Sep. 29, 2000
(86) PCT No.: PCT/EP00/09587
§ 371 (c)(1), (2), (4) Date: Mar. 20, 2002
(87) PCT Pub. No.: WO01/23450
PCT Pub. Date: Apr. 5, 2001

(30) Foreign Application Priority Data

Sep. 29, 1999 (DE) .......................... 199 46 591

(51) Int. Cl.[7] .................. C08G 12/40; C08G 14/12; C04B 24/22
(52) U.S. Cl. .................. 528/129; 528/157; 528/158; 528/162; 528/256; 528/259; 524/2; 524/247; 524/248; 524/401; 524/428; 524/843; 525/497; 525/498; 525/499
(58) Field of Search ................... 528/227, 230, 528/271, 503, 63, 505, 521, 129, 157, 158, 162, 256, 259; 524/2, 247, 248, 401, 428, 843; 525/497–499

(56) References Cited

U.S. PATENT DOCUMENTS

| | | | |
|---|---|---|---|
| 3,830,782 A | * 8/1974 | Kempter et al. | 525/509 |
| 4,069,062 A | * 1/1978 | Burge | 106/803 |
| 4,430,469 A | * 2/1984 | Burge et al. | 524/247 |
| 4,585,853 A | * 4/1986 | Plank et al. | 528/227 |
| 4,666,979 A | * 5/1987 | Plank et al. | 525/54.21 |
| 5,393,811 A | * 2/1995 | Moran et al. | 524/71 |
| 5,705,599 A | * 1/1998 | Felixberger et al. | 528/227 |
| 5,989,391 A | * 11/1999 | Watanabe et al. | 162/164.5 |
| 6,346,588 B1 | * 2/2002 | Fenchl et al. | 526/218.1 |
| 6,566,459 B1 | * 5/2003 | Dopico et al. | 525/498 |

FOREIGN PATENT DOCUMENTS

| | | |
|---|---|---|
| DE | 21 59 737 | 6/1973 |
| EP | 0 238 930 A | 9/1987 |
| EP | 0 690 083 A | 1/1996 |
| GB | 893 901 A | 4/1962 |
| GB | 595 366 | 9/1987 |
| WO | WO-96 34027 | 10/1996 |

OTHER PUBLICATIONS

Patent Abst. Of Japan, vol. 1995, No. 02; Mar. 31, 1995 & JP 06 305 797 (Nippon Steel) Nov. 1, 1994.
Database WPI—Section Ch. Week 199532, Derwent Pub. Ltd. 1995–241149 & CN 1 088 592—Jun. 29, 1994—Abst.

* cited by examiner

*Primary Examiner*—P. Hampton Hightower
(74) *Attorney, Agent, or Firm*—Fulbright & Jaworski L.L.P.

(57) ABSTRACT

Sulfonated condensation products that are stable in storage and have increased thermal stability are based on aminoplastic formers having at least two amino groups or naphthalene and formaldehyde and, optionally include organic nitrogen bases which additionally contain, as nitrogenous formulation auxiliary agents, compounds of general formula (I) $R^1$—NH—X—Y—$R^2$, wherein $R^1$ and $R^2$ independently represent H, —$CH_3$, —$C_2H_5$, —$C_3H_7$, —$(CH_2)_n$—$CH_2$—; X=—$CH_2$, CO, CS; Y=S, NH, —$(CH_2)_m$—; n=0 to 9; m=1 to 4; and/or compounds of general formula (II),

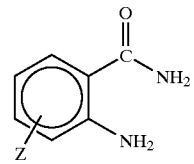

wherein Z=—$OCH_3$, —$SO_3$—H, —$SO_3Na^+$, —$NO_2$, —$NH_2$, —NH—$NH_2$, —$CO_2$—$Na^+$, —CHO. The mole ratio of aminoplastic formers: formaldehyde: sulfite: nitrogenous formulation auxiliary agents rangin from 1:1.9 to 6.0:1.0 to 2.0:0.01 to 1.5 and/or the mole ratio of naphthalene sulfonic acid: formaldehyde; nitrogenous formulation auxiliary agents equals 1:0.7 to 3.0:0.01 to 1.5. Method for preparing these condensation products of using them, e.g., as additives for inorganic binding agents and for hydraulically setting dry mixtures that contain inorganic binding agents are also disclosed.

12 Claims, No Drawings

SULFONATED CONDENSATION PRODUCTS WHICH ARE STABILE IN STORAGE, METHOD FOR THE PRODUCTION THEREOF, AND THEIR USE

The present invention relates to storage-stable sulfonated condensation products, a process for preparing them and their use.

It is sufficiently known that hydraulically setting binders such as cement, lime, gypsum, $CaSO_4$ hemihydrates and anhydrites can be fluidized by addition of dispersants, which makes it possible to set desired low water/binder ratios. Classical dispersants which have been used for over 20 years are melamine-formaldehyde-sulfite (MSF) resins and naphthalenesulfonic acid-formaldehyde (NSF) resins which have been continuously developed further in recent years so as to be able to meet increased expectations.

Thus, DE 195 38 821 describes low-cost MFS resins containing a high proportion of sulfite. According to EP 690 083, a cost reduction is achieved by partial replacement of melamine by urea in a 2-stage process with addition of coreactants such as aminosulfonic acids, aminocarboxylic acids and caprolactam, etc., although this advantage is partly negated by an oxidation step to eliminate the excess sulfite.

Also customary is the addition of sulfanilic acid, as disclosed, for example, in DE 44 11 797 or in DE 196 09 614, in which case the sulfanilic acid is supplemented by polyoxyalkylene derivatives and/or aldehyde acid derivatives.

However, all these condensation products have the disadvantage that the spray drying of aqueous solutions of conventional fluidizers has an extremely adverse effect on the early strength development which is of particular importance for $CaSO_4$ applications due to the high thermal stress during drying.

It is therefore an object of the present invention to develop storage-stable sulfonated condensation products based on an amino resin former having at least two amino groups and sulfite and/or naphthalenesulfonic acid together with formaldehyde which when used as additives for hydraulically setting additives do not display the abovementioned disadvantage of a thermal change but are instead stable over a wide temperature range.

According to the invention, this object is achieved by sulfonated condensation products which further comprise at least one nitrogen-containing formulation auxiliary selected from among compounds of the formula (I)

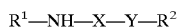

where $R^1$ and $R^2$ are each, independently of one another, H,

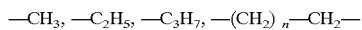

x=—$CH_2$, CO, CS
y=S, NH, —$(CH_2)_m$—
n=0 to 9
m=1 to 4;

and/or compounds of the formula (II)

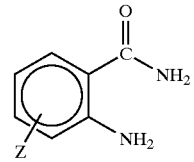

where z=—$OCH_3$, —$SO3H$, —$SO_3^-M^+$, —$NO_2$, —$NH_2$, —NH—$NH_2$, —$CO_2^{-M+}$, —CHO, M=a cation, in particular Na and in which the molar ratio of amino resin former: formaldehyde: sulfite: nitrogen-containing formulation auxiliary is 1:1.9–6.0:1.0–2.0: 0.01–1.5 and/or the molar ratio of naphthalenesulfonic acid: formaldehyde nitrogen-containing formulation auxiliary is 1:0.7–3.0:0.01–1.5.

Contrary to all expectations, it has been found that the storage-stable sulfonated condensation products of the invention display, in addition to the desired temperature stability, a drastic reduction in the undesirable outgassing of formaldehyde and/or ammonia which has hitherto been typical for this class of product. This effect displayed so clearly was not foreseeable.

As regards the components of the storage-stable sulfonated condensation products, the invention provides for melamine and/or urea to be used as preferred amino resin formers. These can be replaced to an extent of up to 70% by weight by thiourea, dicyandiamide, a guanidine (salt) and mixtures thereof, although ranges of from 30 to 50% by weight are to be preferred.

Likewise, urea and also thiourea, N-methylurea, 2-imidazolidinone and/or anthranilamide represent typical organic formulation auxiliaries for the purposes of the invention.

The nitrogen-containing formulation auxiliary can, if desired, be partly incorporated into the condensate of amino resin former, formaldehyde and sulfite component or form an adduct with this.

For some applications, it has been found to be advantageous to use the condensation products as aqueous solutions. Aqueous solutions having a solids content of from 20 to 60% by weight and a viscosity at 95° C. of from 0.5 to 250 $mm^2.s^{-1}$ are particularly useful for this purpose. On the other hand, the condensation products can also be used as dry products having a residual moisture content of <5% (weight/weight).

Apart from the storage-stable sulfonated condensation products themselves, the present invention also claims a process for preparing them, in which a) the amino resin former or formers, formaldehyde and the sulfite component are heated in a molar ratio of 1:1.9–6.0: 1.0–2.0 in aqueous solution with addition of a portion 1 of the selected molar amount of the formulation auxiliary at a temperature of from 40° C. to 90° C. and a pH of from 7.5 and 13.0 until sulfite is no longer detectable, b) a portion 2 of the selected molar amount of the formulation auxiliary is then added at a pH of from 3.0 to 7.0 and the condensation is continued at a temperature of from 60 to 95° C. until the condensation product has a viscosity at 95° C. of from 1 to 250 $mm^2.s^{-1}$, c) the condensation product is subsequently brought to a pH of from 7.5 to 12.0 or a thermal after-treatment is carried out at a pH of ≧10.0 and a temperature of from 65 to 90° C. and d) a portion 3 of the selected molar amount of the formulation auxiliary is finally added, where the sum of portion 1, portion 2 and portion 3 of the formulation auxiliary corresponds to the molar amount of the formulation auxiliary of the formula (I) and/or (II) and each individual portion can amount to a proportion of from 0 to 100 total-%, with the proviso that the portion 1 is <100% and preferably <99% and particularly preferably <90%, respectively.

Furthermore, this process provides for the condensation products obtained in this way to be dried to a preferred residual moisture content of <5%, which should preferably be carried out by evaporation of the water under reduced pressure, in a spray drier or on a roller dryer.

As an alternative method of preparing the condensation products claimed, it is proposed that sulfonated melamine-formaldehyde condensation products, sulfonated melamine-urea-formaldehyde condensation products or naphthalene-sulfonic acid-formaldehyde condensation products be admixed with from 0.1 to 50% by weight, based on the content of solid active components, of a formulation auxiliary of the formulae (I) and/or (II) defined above or mixtures thereof and, if desired, dried to a residual moisture content of <5%.

The storage-stable sulfonated condensation products are used either as additives for inorganic binders, e.g. cement, lime, gypsum, $CaSO_4$ hemihydrates and anhydrites, in an amount of from 0.01 to 20% by weight, based on the amount of the inorganic binders used, or else as additive for hydraulically setting dry mixes which comprise inorganic binders, in which case preference is given to amounts of from 0.01 to 20% by weight, based on the amount of the inorganic binders used.

Overall, the storage-stable sulfonated condensation products of the invention represent a significant advance in respect of the thermal stability of these condensation products and also take account of the increased demands made of environmentally friendly products.

The following examples illustrate these advantages of the condensation products of the invention.

EXAMPLES

Example 1

Comparison, Without Formulation Auxiliary 332.1 g of formalin (30% strength), 156.5 g of water and 0.6 g of a 20% strength aqueous sodium hydroxide solution were placed in a round-bottom flask. 126.0 g of melamine were subsequently introduced, the solution was heated to 30° C. and 121.3 g of sodium pyrosulfite and 16.5 g of 20% strength NaOH were added and the mixture was heated at 80° C. until the sulfite is completely incorporated.

After the sulfite had been completely incorporated, 56.0 g of $H_2SO_4$ (10% strength) were added and condensation was then carried out at 80° C. until the viscosity was 9.1 cSt; finally, 66.5 g of a 20% strength sodium hydroxide solution were added and the mixture was cooled to room temperature (RT).

The finished solution displayed the following physical data:

Solids content: 40.7% by weight
Viscosity: 3.40 cSt (20° C.)
pH: 12.0
$HCHO_{free}$: 0.40%

This solution was dried in a spray drier to give a colorless powder; $HCHO_{free}$ content of the powder after drying: 0.22%.

Examples according to the invention: (with formulation auxiliary)

Example 2

332.1 g of formalin (30% strength), 156.5 g of water and 0.6 g of a 20% strength aqueous sodium hydroxide solution were placed in a round-bottom flask. 126.0 g of melamine were subsequently introduced, the solution was heated to 30° C. and 121.3 g of sodium pyrosulfite and 16.5 g of a 20% strength aqueous sodium hydroxide solution were added and the mixture was heated at 80° C. until the sulfite is completely incorporated.

After the sulfite had been completely incorporated, 13.6 g of anthranilamide and 37.0 g of N-methylurea and also 56.0 g of $H_2SO_4$ (10% strength) and 25.3 g of water were added and condensation was carried out at 80° C. until the viscosity was 9.1 cSt; finally, 20.9 g of a 20% strength sodium hydroxide solution were added and the mixture was cooled to RT.

The finished solution displayed the following physical data:

Solids content: 43.8% by weight
Viscosity: 2.89 cSt (20° C.)
pH: 12.1
$HCHO_{free}$: 0.27%

This solution was dried in a spray drier to give a colorless powder; $HCHO_{free}$ content of the powder after drying: 0.19%.

Example 3

332.1 g of formalin (30% strength), 156.5 g of water and 0.6 g of a 20% strength aqueous sodium hydroxide solution were placed in a round-bottom flask. 126.0 g of melamine were subsequently introduced, the solution was heated to 30° C. and 121.3 g of sodium pyrosulfite and 16.5 g of a 20% strength aqueous sodium hydroxide solution were added and the mixture was heated at 80° C. until the sulfite is completely incorporated.

After the sulfite had been completely incorporated, 56.0 g of $H_2SO_4$ (10% strength) were added and condensation was carried out at 80° C. until the viscosity was 9.1 cSt; 13.6 g of anthranilamide, 25.8 g of 2-imidazolidinone and 20.1 g of water were then added and the solution was made alkaline by addition of 14.7 g of a 20% strength sodium hydroxide solution and cooled to RT.

The finished solution displayed the following physical data:

Solids content: 43.1% by weight
Viscosity: 3.10 cSt (20° C.)
pH: 11.3
$HCHO_{free}$: 0.10%

This solution was dried in a spray drier to give a colorless powder; $HCHO_{free}$ content of the powder after drying: 0.08%.

Example 4

332.1 g of formalin (30% strength), 156.5 g of water and 0.6 g of a 20% strength aqueous sodium hydroxide solution were placed in a round-bottom flask. 126.0 g of melamine were subsequently introduced, the solution was heated to 30° C. and 121.3 g of sodium pyrosulfite and 16.5 g of a 20% strength aqueous sodium hydroxide solution and also 37.0 g of N-methylurea, 76.1 g of thiourea and 150.6 g of water were added and the mixture was heated at 80° C. until the sulfite is completely incorporated.

After the sulfite had been completely incorporated, 56.0 g of $H_2SO_4$ (10% strength) were added and condensation was carried out at 80° C. until the viscosity was 3.9 cSt; finally, 22.2 g of a 20% strength sodium hydroxide solution were added and the mixture was cooled to RT.

The finished solution displayed the following physical data:

Solids content: 41.8% by weight
Viscosity: 2.53 cSt (20° C.)
pH: 12.3
$HCHO_{free}$: 0.08%

This solution was dried in a spray drier to give a colorless powder; $HCHO_{free}$ content of the powder after drying: 0.07%.

Example 5

332.1 g of formalin (30% strength), 156.5 g of water and 0.6 g of a 20% strength aqueous sodium hydroxide solution were placed in a round-bottom flask. 126.0 g of melamine were subsequently introduced, the solution was heated to 30° C. and 121.3 g of sodium pyrosulfite and 16.5 g of a 20% strength sodium hydroxide solution and also 37.0 g of N-methylurea, 19.0 g of thiourea and 92.8 g of water were added and the mixture was heated at 80° C. until the sulfite is completely incorporated.

After the sulfite had been completely incorporated, 56.0 g of $H_2SO_4$ (10% strength) were added and condensation was carried out at 80° C. until the viscosity was 5.3 cSt; finally, 15.8 g of a 20% strength sodium hydroxide solution were added and the mixture was cooled to RT.

The finished solution displayed the following physical data:

Solids content: 40.5% by weight.
Viscosity: 2.84 cSt (20° C.)
pH: 12.0
$HCHO_{free}$: 0.10%

This solution was dried in a spray drier to give a colorless powder; $HCHO_{free}$ content of the powder after drying: 0.11%.

In the following, the properties of the resin-containing solutions and the powders produced therefrom were compared in an α-hemihydrate environment:

Basic formulation: 50.0 g of α-hemihydrate
  16.0 g of water
  0.180 g of the respective amino resin (calculated as solid)

Procedure:

The fluidized plaster slurries were poured from the mixing cup onto a glass plate in one action; after determining the spread (SP), setting was monitored by means of a Vicat needle about 1 cm from the edge of the gypsum plaster cake.

| Examples | Results: | | | | |
| --- | --- | --- | --- | --- | --- |
| | as solution | | as powder | | Δt of |
| | SP [cm] | Setting [min] | SP [cm] | Setting [min] | setting [min] |
| 1 (comparison) | 10.2 | 35 | 10.6 | 43 | 8 |
| 2 | 8.8 | 33 | 8.7 | 35 | 2 |
| 3 | 9.9 | 41 | 9.3 | 41 | 0 |
| 4 | 9.5 | 35 | 9.6 | 33 | −2 |
| 5 | 9.8 | 35 | 9.9 | 33 | −2 |

It can be seen that, in examples 2 to 4 according to the invention, setting of the gypsum plaster mix remains unchanged within the limits of accuracy when the solution has been spray dried to give a powder, while example 1 (comparison) without addition according to the invention of a formulation auxiliary displays a significantly prolonged setting time.

The same significant result can be seen in the change in the $HCOH_{free}$ values after drying (cf. examples 1 to 5). In example 1 (comparison) there is a relatively large decrease in the concentration of unreacted formaldehyde, while the resins of examples 2 to 4 according to the invention display excellent thermal stability during drying.

What is claimed is:

1. A storage-stable sulfonated condensation product based on an amino resin former having at least two amino groups, at least one of sulfite and naphthalenesulfonic acid; and formaldehyde and, optionally organic nitrogen bases, comprising:

at least one nitrogen-containing formulation auxiliary selected from the group consisting of a compound of formula (1)

$$R_1\text{—NH—X—Y—}R^2 \quad (1)$$

wherein
  $R^1$ and $R^2$ are independently H, —$CH_3$, —$C_2H_5$, —$C_3H_7$ or together form —$(CH_2)_n$—$CH_2$—;
  X is —$CH_2$, CO, or CS;
  Y is S, NH, or —$(CH_2)_m$; —
  n is 0 to 9
  m is 1 to 4;
and a compounds of formula (II)

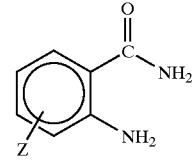

wherein

Z is —$OCH_3$, —$SO_3H$, —$SO_3^-M^+$, —$NO_2$, —$NH_2$, —NH—$NH_2$, —$CO_2^-M^+$, —CHO, or H

M is a cation;
wherein the molar ratio of amino resin former: formaldehyde: sulfite: nitrogen-containing formulation auxiliary is 1:1.9–6.0:1.0–2.0:0.01–1.5 and/or the molar ratio of naphthalene-sulfonic acid: formaldehyde: nitrogen-containing formulation auxiliary is 1:0.7–3.0:0.01–1.5.

2. A condensation product as claimed in claim 1, wherein said amino resin former is selected from the group consisting of melamine and urea.

3. A condensation product as claimed in claim 1, wherein said formulation auxiliary is selected from the group consisting of urea, thiourea, N-methylurea, 2-imidazolidinone and anthranilamide as formulation auxiliaries.

4. A condensation product as claimed in claim 1, wherein the amino resin former comprises up to 70% by weight of at least one of thiourea, dicyandiamide, a guanidine, and a guanidine salt.

5. A condensation product as claimed in claim 1, wherein the condensation product is an aqueous solution having a solids content of from 20 to 60% by weight.

6. A condensation product as claimed in claim 5, wherein the viscosity of the aqueous solution at 95° C. is from 0.5 to 250 $mm^2.s^{-1}$.

7. A condensation product as claimed in claim 1, wherein the aqueous solution has been dried to a residual moisture content of <5%.

8. A process for preparing a condensation product as claimed in claim 1, comprising:
   a) heating said amino resin former or formers, said formaldehyde and said sulfite component in a molar ratio of 1:1.9–6.0:1.0–2.0 in aqueous solution with addition of a portion of the selected molar amount of the formulation auxiliary at a temperature of from 40° C. to 90° C. and a pH of from 7.5 and 13.0 until sulfite is no longer detectable;
   b) adding a portion 2 of the selected molar amount of the formulation auxiliary at a pH of from 3.0 to 7.0 and continuing the condensation at a temperature of from 60 to 95° C. until the condensation product has a viscosity at 95° C. of from 1 to 250 $mm^2.s^{-1}$;
   c) adding the pH of condensation product to a pH of from 7.5 to 12.0 or conducting a thermal after-treatment at a pH of $\geq$10.0 and a temperature of from 65 to 90° C.; and
   d) adding a portion 3 of the selected molar amount of the formulation auxiliary;
      wherein the sum of portion 1, portion 2 and portion 3 of the formulation auxiliary corresponds to the molar amount of the formulation auxiliary of the formula (I) and/ (II) and each individual portion can amount to a proportion of from 0 to 100 total-%, wherein portion 1 is <100%.

9. The process as claimed in claim 8, wherein the resultant condensation products are dried in a spray drier or on a roller drier to a preferred residual moisture content of <5% by evaporation of the water under reduced pressure.

10. A process for preparing a condensation product as claimed in claim 1, wherein the sulfonated melamine-formaldehyde condensation products, sulfonated melamine-urea-formaldehyde condensation products or naphthalene-sulfonic acid-formaldehyde condensation products are admixed with from 0.1 to 50% by weight, based on the content of solid active components, of a formulation auxiliary of the formula (I) and (II) or mixtures thereof and dried to a residual moisture content of <5%.

11. An inorganic binders comprising from 0.01 to 20% by weight of condensation product as claimed in claim 1, based on the amount of the inorganic binders.

12. An hydraulically setting dry mixes comprising from 0.01 to 20% by weight, of a condensation product as claim in claim 1, based on the amount of inorganic binders.

* * * * *